March 26, 1968 R. C. WRIGHT 3,374,727
BEVERAGE DISPENSING APPARATUS
Filed June 20, 1966 3 Sheets-Sheet 1

INVENTOR.
ROBERT C. WRIGHT
BY Synnestvedt & Lechner
ATTORNEYS

March 26, 1968  R. C. WRIGHT  3,374,727
BEVERAGE DISPENSING APPARATUS
Filed June 20, 1966  3 Sheets-Sheet 2

INVENTOR.
ROBERT C. WRIGHT
BY
Synnestvedt & Lechner
ATTORNEYS

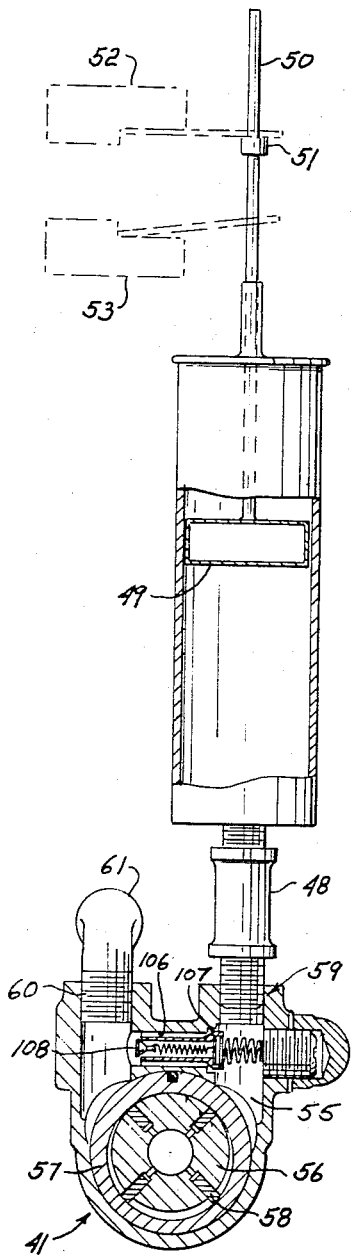
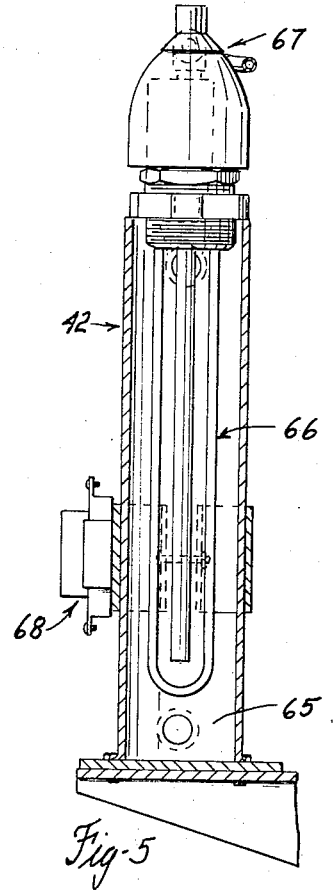
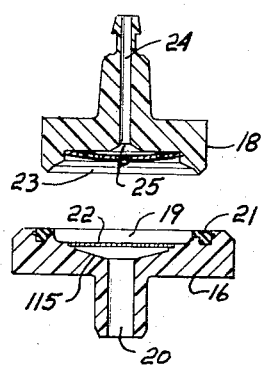
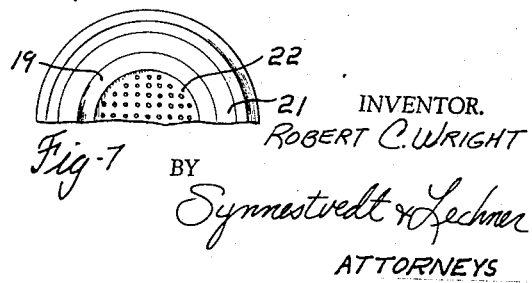

United States Patent Office 3,374,727
Patented Mar. 26, 1968

3,374,727
BEVERAGE DISPENSING APPARATUS
Robert C. Wright, Huntingdon Valley, Pa., assignor to Rudd-Melikian, Inc., Warminster, Pa., a corporation of Pennsylvania
Filed June 20, 1966, Ser. No. 558,925
5 Claims. (Cl. 99—282)

This invention relates to an apparatus for brewing hot beverages by passing a hot brewing liquid through liquid permeable charges of particulate beverage material.

Although not limited thereto, the invention is especially concerned with the provision of apparatus for brewing espresso coffee from charges of ground coffee bean. The invention is well adapted for the brewing of individual servings of espresso coffee from pods or cartridges of ground, briquetted coffee bean spaced along a carrier tape. Such a tape is disclosed in United States Patent No. 3,186,137, assigned to the assignee of this application.

Successful brewing of espresso coffee in automatic brewing equipment raises several problems not ordinarily encountered when dealing with more conventional coffees and like beverages. The problems are particularly troublesome when the machine is used as a vending machine, because the customer expects his drink to be delivered as soon as he deposits his coin. Under such conditions, it is particularly important in the brewing of flavorful espresso coffee to brew the coffee at temperatures very close to but not above the boiling point of water and at pressures of several atmospheres. However, if the temperature in the brewing chamber rises above the boiling point, the flavor of the drink will be impaired. Moreover, such temperatures tend to produce excessive steam flashing which also seems to impair the flavor of the beverage and also destroys the integrity of the beverage cartridges when the coffee is encapsulated in cartridges spaced along a carrier tape as mentioned above.

With the foregoing in view, an important object of the invention is the provision of a brewing apparatus which is particularly effective in delivering required amounts of brewing liquid at temperatures very close to the boiling point and pressures well above atmospheric during a brewing cycle.

A further object of the invention is the provision of brewing apparatus well suited for vending machine use, the apparatus being capable of rapidly brewing, on demand, individual servings of hot, tasty, espresso coffee.

Still another object of the invention is the provision of an extremely compact arrangement of brewing apparatus having the requisite qualities of durability, safety and dependability, required in vending machine equipment.

These and various other objects of the invention are achieved by a system which includes a reservoir connected to the water line and which stores a quantity of water prior to the start of a dispensing cycle. A positive displacement pump evacuates the reservoir during the dispensing cycle, forcing the water into the bottom of a boiler filled with a volume of water substantially larger than the volume of water in the reservoir. A water line leads from the top of the boiler to a beverage extracting chamber in which a charge of beverage material is confined. A valve in the line is opened during the dispensing cycle and hot water from the top of the boiler is displaced into the extraction chamber by the charge of water fed into the boiler by the pump. The pump is provided with pressure regulating means in order to maintain the pressure at a constant level, preferably about 135 p.s.i. substantially thorughout the entire brewing cycle.

Turning now to the drawings illustrating the preferred form of the invention:

FIGURE 4 is a fragmentary detail view showing portions of the structure shown in FIGURE 3;

FIGURE 5 is a fragmentary sectional view showing the boiler illustrated in FIGURE 3;

FIGURE 6 is a sectional view showing the pair of brewing members in section; and FIGURE 7 is a fragmentary view showing in plan the lower brewing member.

Figure 2:
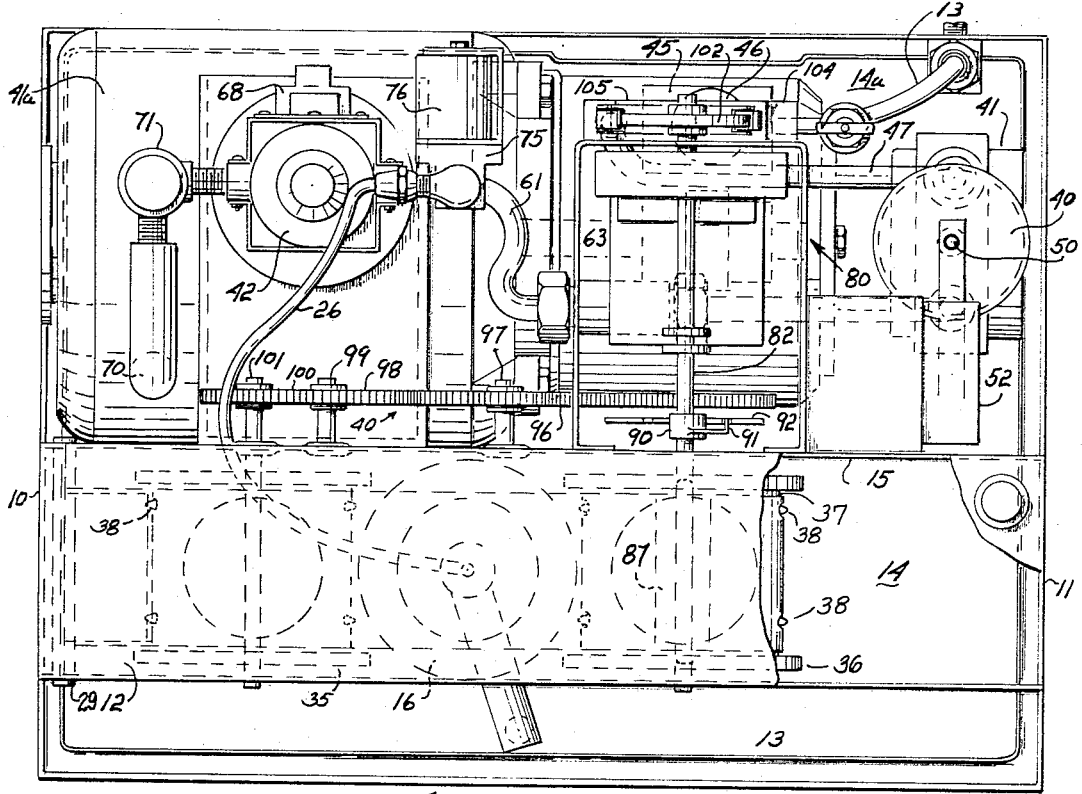
FIGURE 2 is a plan view of the brewing structure shown in FIGURE 1.
Figure 1:
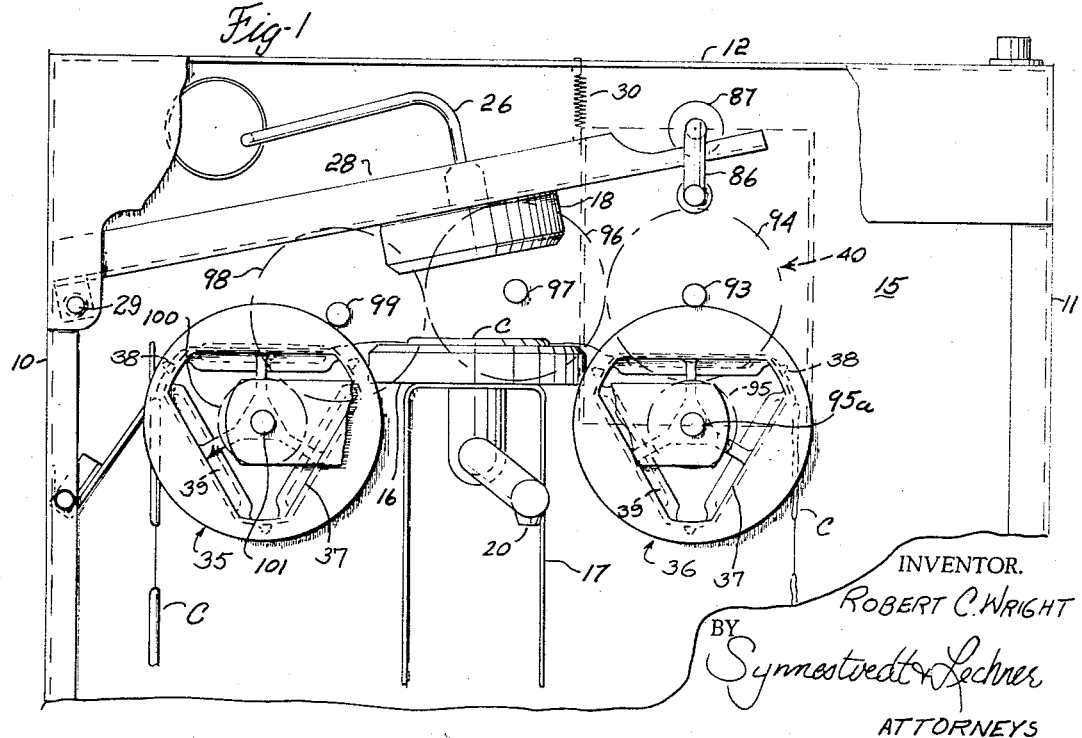
FIGURE 1 is an elevational view of the upper portion of the apparatus showing the brewing chamber parts.
Figure 3:
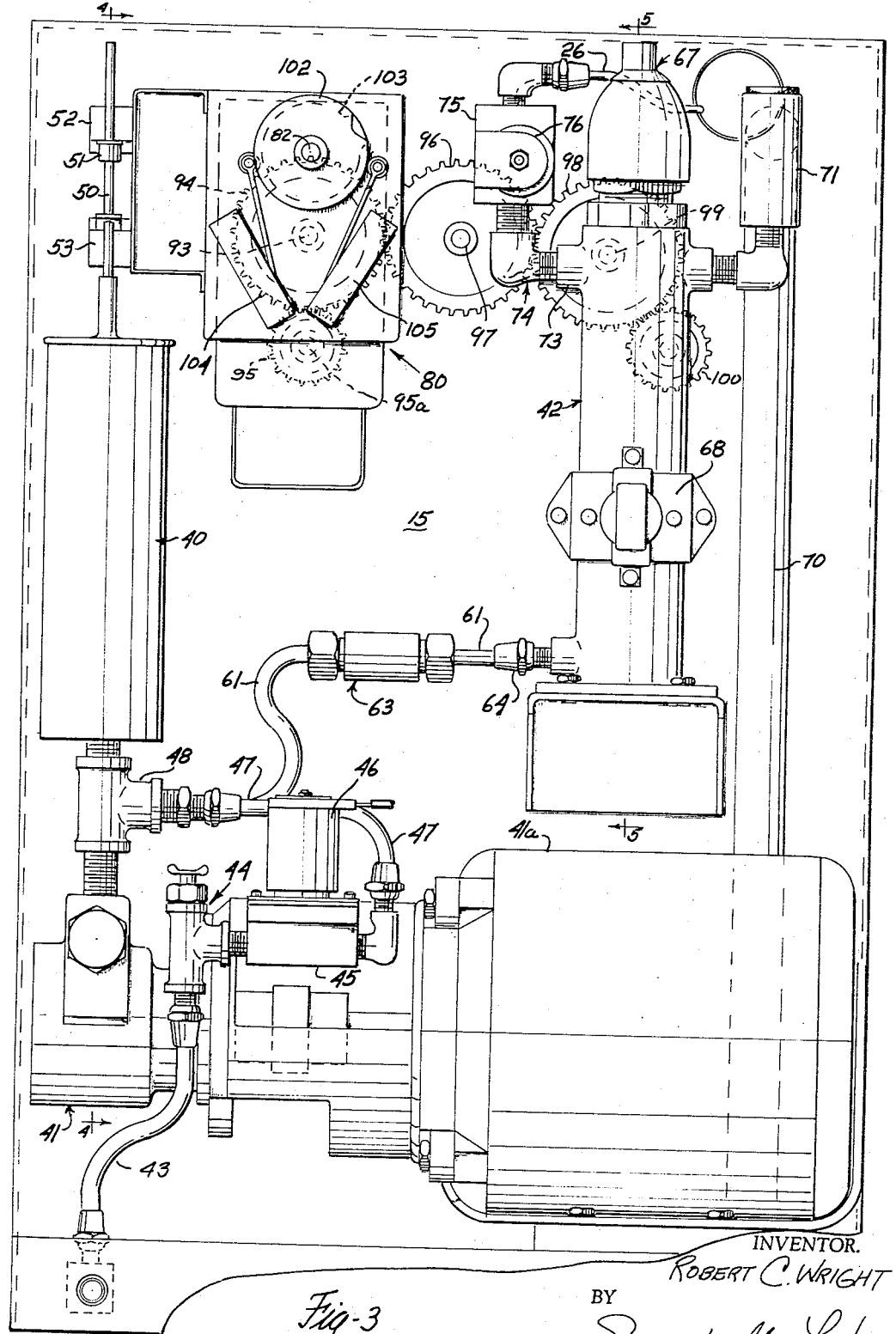
FIGURE 3 is an elevational view showing the structure mounted in the back half of the cabinet.

Considering first FIGURES 1 through 3, the preferred embodiment of the brewer is shown mounted on a frame which includes side wall members 10 and 11, a top lateral brace 12 and a base 13. The frame is preferably divided into front and rear sections 14 and 14a by means of a partition 15 as is best shown in FIGURE 2.

In general, the portion of the apparatus which includes the beverage extracting chamber and the indexing mechanism for indexing cartridges holding the beverage material is mounted in the portion of the cabinet designated by the numeral 14, while the water supply and control mechanism is mounted in the portion designated 14a.

The brewing chamber is preferably comprised of a lower brewing member 16 which is rigidly mounted on a U-shaped bracket 17 which is in turn secured by any suitable means to the partition 15. A second brewing member 18 is mounted above the brewing member 16. Although either or both of the brewing members could be moveably mounted, I prefer to rigidly mount the lower brewing member 16 as described above, and to mount the upper brewing member 18 for movement towards and away from the brewing member 16 by means to be described hereinafter.

As can be seen in the sectional view in FIGURE 6, brewing member 16 is provided with an annular dished depression 19 and a drain 20 leading therefrom. An annular sealing ring 21 surrounds the depression 19. A screen 22, which is supported somewhat above the bottom of the depression, for reasons to be described hereinafter, covers the drain 20. The upper brewing member 18 is also provided with a recess indicated by the numeral 23 in FIGURE 6. Brewing member 18 is provided with an inlet line 24 which terminates in an inlet port 25 in the center of the cavity 23.

A flexible tubing 26, shown in FIGURES 1 and 2, is connected to the line 24 and communicates with the hot water supply system to be described hereinafter.

In order to move the brewing member 18, the brewing member is mounted on an arm 28 which is pivotally mounted on a shaft 29 secured to the frame of the apparatus. A coil spring 30 urges the arm upwardly into a position in which the two brewing members are separated. Mechanism, to be described, pulls the arm 28 downwardly to effect a firm seal between the brewing members 16 and 18, at the commencement of the brewing cycle.

Although individual charges of beverage material could be placed in the brewing chamber by hand, in preparation for each brewing cycle, I prefer that the charges be carried on a tape at spaced intervals. The charges are preferably encapsulated in water permeable paper and are designated by the reference character C in the drawings.

In the feeding of tape, it is quite important that the tape be advanced by a precise amount in order to always locate successive cartridges in the correct position in the cavity in the lower brewing member 16. If the tape is indexed so that a cartridge is not precisely located within the dished recess 19, the brewing chamber would probably not seal properly when the upper brewing member 18 is moved downwardly. This is particularly important when brewing espresso coffee, since the high brewing pressures and temperatures would cause considerable amounts of water and steam to be forced through the space between the two brewing members.

For this reason, I provide the tape with indexing means in the form of holes spaced at regular intervals throughout its length. The tape is guided over indexing wheels 35 and 36. As viewed in FIGURE 1, each indexing wheel is provided with triangular prism shaped indexing members 37. Indexing pins 38 are located at the corners of each of the triangularly shaped indexing members.

In addition, each face of each indexing member is provided with a shallow cartridge receiving recess 39. The indexing members are driven by a gear train generally indicated by the numeral 40 in FIGURE 2. The gear train, described more particularly hereinafter, moves the indexing members and the indexing pins exactly 120 degrees during each operating cycle. This precisely positions successive cartridges in the proper position between the brewing members so that the chamber can be properly sealed when the brewing members move together.

Attention is now directed to FIGURE 3 which shows the portion of the apparatus located behind the partition 15. This apparatus includes generally the drive means for the brewer and indexing heads and the water supply system including a reservoir 40, a positive displacement pump 41 and a boiler 42. Water is supplied to the system through inlet line 43 which may be connected to a source of fresh water, usually the water supply for the building in which the brewer is to be located. A needle valve 44 is located in the line 43 and is adjustable by means of a handle 44a to control the rate of flow of water into the system. An inlet valve 45 is connected to the downstream side of the valve 44. The valve 45 is controlled by a solenoid 46 which is operated to open and close the valve at selected times during the operating cycle. A conduit 47 extends from the outlet side of valve 45 to a T shaped fitting 48, the upwardly extending branch of which leads to the reservoir 40.

Reservoir 40 is shown in section in FIGURE 4 and as shown therein is provided with a float 49 to which is connected a control rod 50. A projection 51 secured to the control rod operates a switch 52 when the reservoir is filled. Switch 52 closes valve 45 to shut off the supply of water to the reservoir at that time. A second switch 53 is operated by projection 51 when the water level in the reservoir drops below the predetermined level. The purpose of this switch will be explained hereinafter.

The lower end of the T shaped fitting is connected by input side 55 of the pump 41.

Pump 41 is preferably a rotary pump and is provided with rotor 56 eccentrically mounted with respect to the axis of its housing 57. Radially extending carbon or graphite vanes 58 are slideably mounted in slots in the rotor 56.

The lower end of T shaped fitting 48 is connected to an inlet port 59 for the pump 41. The pump is provided with an output port 60 which is connected to a line 61 leading to the boiler 42 as may best be seen in FIGURE 3. A pair of check valves are mounted in a housing 63 in the line 61 in order to prevent reverse flow from the boiler to the pump and reservoir. A coupling member 64 connects the line 61 to the bottom of the boiler.

Boiler 42, shown in section in FIGURE 5, includes a boiler chamber 65 and a heating element 66, typically of the electrical resistance type. Heat regulating means including an adjustable thermostatic control element 67 of the known construction regulates the water temperature within the chamber 65 and holds that temperature at about 220° F. A second thermostatic element 68 is fastened to the outside of the boiler. Thermostatic element 68 responds to a temperature above that of the thermostatic control element 67 and operates a switch to disconnect the heater in the event that the boiler temperature rises above a predetermined safe level. An overflow line 70 is connected to the top of the boiler and is provided with a relief valve 71 which opens in case predetermined safe pressures are exceeded. Line 70 leads to the bottom of the cabinet at which point a suitable receptacle may be provided.

The brewing liquid is delivered from the top of the boiler through a port 73 to which is connected a fitting 74. A valve 75, controlled by a solenoid 76 which opens and closes the valve, is connected to fitting 74. The output side of the valve 75 leads to the line 26 which is connected to the upper brewing member 18.

A motor, generally designated by the numeral 80, is provided for operating the indexing mechanism and for moving the indexing member 18 toward and away from its position of engagement with the indexing member 16. To accomplish this, motor 80 drives a shaft 82 one revolution during each operating cycle. One end of shaft 82 carries a U shaped crank arm 86 which is positioned on the front side of the partition 15. A roller 87 is mounted on the portion of the crank arm which straddles the arm 28. Upon rotation of shaft 82 through a full revolution, the crank first depresses the pivot arm 28 to bring the upper brewing member 18 into sealing engagement with the lower brewing member 16, thereby forming a closed brewing chamber. During the latter portion of the revolution of the shaft 82, the roller 87 rises and the spring 30 draws the brewing member 18 away from the brewing member 17, thereby opening the brewing chamber.

Also secured on shaft 82, just behind the partition 15, is a Geneva driving member 90 shown in plan in FIGURE 2. A pin 91 is mounted on the end of the driving member 90. The pin is adapted to engage radial slots in a Geneva wheel 92. Geneva wheel 92 is mounted on a shaft 93 located just beneath shaft 82 (FIGURES 1 and 3). A drive gear 94 is also secured to the shaft 93. Gear 94 meshes with a gear 95 mounted on a stub-shaft 95a carrying indexing member 37. Also meshing with the gear 94 is a gear 96 journalled on a stub-shaft 97. The gear 96 grives a gear 98 journalled on a stub-shaft 99, which in turn drives a pinion 100 secured to the left hand indexing shaft 101 as viewed in FIGURE 1.

The Geneva wheel driven gear train provides a means for accurately indexing the indexing members 37 by exactly rotating these members 120 degrees during each complete revolution of shaft 82.

The other end of shaft 82 carries cycle control cams 102 and 103 which regulate the opening and closing of switches 104 and 105 respectively. These switches 104 and 105 control the cycling of the apparatus through suitable circuitry.

A typical operating cycle of the apparatus so far described will now be set forth starting from the point at which the reservoir 40 and the boiler 42 are filled with water. At this point in the cycle, the brewing member 18 is in the raised position shown in FIGURE 1 and the indexing members have previously positioned a cartridge in the dished cavity in the lower brewing member 16. A brewing cycle is now initiated either by depositing a coin if the apparatus is designed for vending machine operation or closing a suitable button operated switch. In either event, a circuit is closed to energize the motor 80, so that the motor rotates shaft 82, turning crank 86 to draw the upper brewing member 18 downwardly to establish a firm seal with lower brewing member 16. At this point in the cycle, the switch 104 is closed and this completes a circuit which connects pump motor 41a to the power supply. At the same time, the solenoid 76 for the discharge valve 75 opens that valve. The pump forces a charge of cold water through the line 61 into the bottom of the boiler. A corresponding charge of hot water is thereby forced from the top of the boiler out through valve 75 and the outlet line 26 to the brewing chamber.

Preferably the pump 41 is designed to develop considerable pressure in the brewing chamber, the preferred brewing pressure being about 135 p.s.i. measured at the boiler during the pumping portion of the cycle. In order to regulate the pressure, pump 41 is provided with a suitable bypass line 106, best shown in FIGURE 4, the bypass line connecting the inlet and outlet to the pump. The bypass line is provided with spring loaded pressure relief valve members 107 and 108 of conventional type. Depending upon the spring constants and the loading of the springs for the valves, flow will take place through the bypass line during the pumping cycle when a certain pressure is exceeded. This will occur, for example, when resistance to flow is encountered due to a cartridge in the brewing chamber. At that point, the spring loaded valve 108 will open to circulate some of the water from the outlet to the inlet side of the pump. Normally some flow will take place in the bypass line whenever a charge of beverage is in the chamber, so that the brewing pressure is always maintained at the desired level.

As the water is withdrawn from the reservoir, the float 49 drops until the point is eventually reached at which the switch 53 is operated by the projection 51. Switch 53 is connected to the circuit for pump motor 41a and when operated by the projection 51 shuts off the pump motor. The switch 53 also closes the discharge valve 75, and opens valve 45, allowing the reservoir to fill. I have found it convenient to re-energize the motor 80 by means of switch 52 which rotates cam 102 until switch 105 is closed, shutting off motor 80. Switch 52 deactivates the solenoid 46 to close the valve 45. Before the motor 80 shuts off it raises the brewing head 18 and thereafter indexes the tape so that a fresh cartridge is placed in the cavity in the lower brewing member 16.

According to the preferred embodiment of the invention, the pump forces just enough water into the boiler to displace enough to brew a single serving of espresso coffee. I also prefer to use a boiler having a volume of five or six times that of the amount dispensed. Thus, an adequate supply of hot water is assured even during periods of heavy demand.

It is also important that the volume within the line 26 between the valve 75 and the brewing head be appreciated smaller than the volume of the displaced liquid. If this is not done, considerable amounts of steam are developed after the valve 75 is closed when brewing head 18 is raised. I have found that the flashing of a considerable amount of water to steam may rupture a cartridge when tape is used with the machine, causing considerable messiness and interfering with tape indexing.

I have found the present invention very effective in producing espresso coffee, the equipment being extremely reliable in operation. When the brewing pressure is maintained at about 135 p.s.i. and the brewing temperature at about 195 degrees F., a good tasting cup of espresso coffee will be made with a typical encapsulated charge of ground coffee in about twenty seconds' time.

I claim:
1. In apparatus for sequentially brewing beverage portions by passing a hot brewing liquid through particulate beverage material, said apparatus comprising a pair of brewing members arranged for relative movement toward and away from a position of engagement with each other in which they cooperate to define a beverage extraction chamber in which said briquettes are successively confined and wherein one of said members has an inlet port for the introduction of hot water thereinto and the other has an outlet port for the discharge of extract therefrom; a reservoir for storing a supply of water, a water line connected to said reservoir, said line being adapted to be connected to an outside source of water under line pressure, an inlet valve in said line and means controlling said valve for selectively admitting water from said outside source to fill said reservoir with a metered quantity of water, a positive displacement pump, an inlet for said pump connected to said reservoir and a pump outlet, a boiler including a boiler chamber and a heater for heating a supply of water in said chamber, the outlet of said pump being connected to the bottom of said chamber, an outlet line connecting the boiler chamber with the extraction chamber inlet port, a discharge valve in said outlet line, means for opening said valve when said brewing members are in said position of engagement, and for operating said pump to pump the water in said reservoir into said boiler, thereby displacing hot water under pressure through said outlet line, and pressure regulating means for said pump, said pressure regulating means being operable to maintain the pressure in said extraction chamber at a substantially constant level above atmospheric throughout an extraction operation.

2. Apparatus according to claim 1, wherein said pump is a rotary vane type pump.

3. Apparatus according to claim 1, wherein said pressure regulating means includes a line interconnecting the inlet and outlet for said pump, a relief valve in said bypass line, said valve being biased to open said line when the pressure downstream from said pump exceeds a predetermined level.

4. Apparatus according to claim 1, wherein the volume of said boiler chamber is greater than the volume of water displaced by said pump during a brewing cycle.

5. Apparatus according to claim 1, wherein the volume of the line downstream from said discharge valve is appreciably smaller than the volume of said displaced liquid, thereby minimizing the production of steam in said line when said brewing chamber members move away from said position of engagement.

References Cited

UNITED STATES PATENTS

| | | | |
|---|---|---|---|
| 3,229,612 | 1/1966 | Brown | 99—289 X |
| 3,314,357 | 4/1967 | Valente | 99—302 X |
| 3,327,613 | 6/1967 | Davis | 99—289 X |

FOREIGN PATENTS

| | | |
|---|---|---|
| 927,553 | 5/1963 | Great Britain. |
| 939,630 | 10/1963 | Great Britain. |

WILLIAM I. PRICE, *Primary Examiner.*